May 13, 1941. L. B. SIMON 2,241,647
LICENSE PLATE AND TRUNK HANDLE ASSEMBLY
Filed Sept. 16, 1939
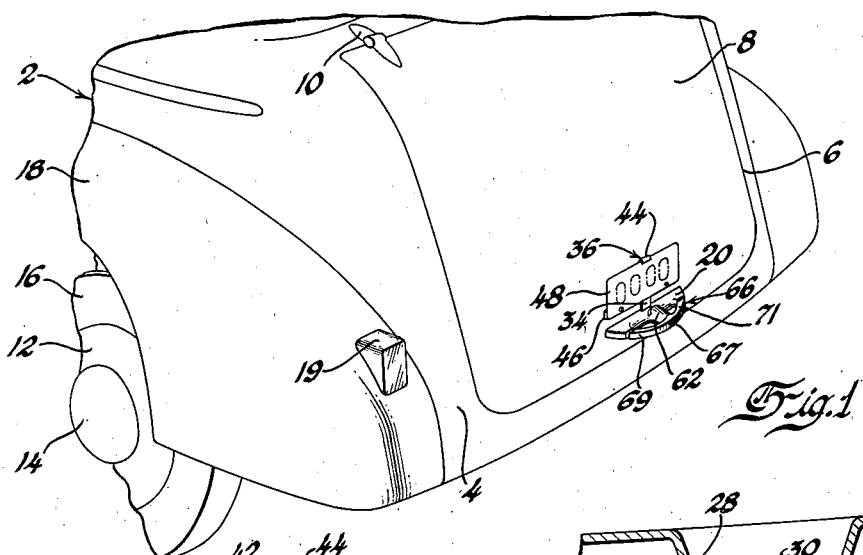
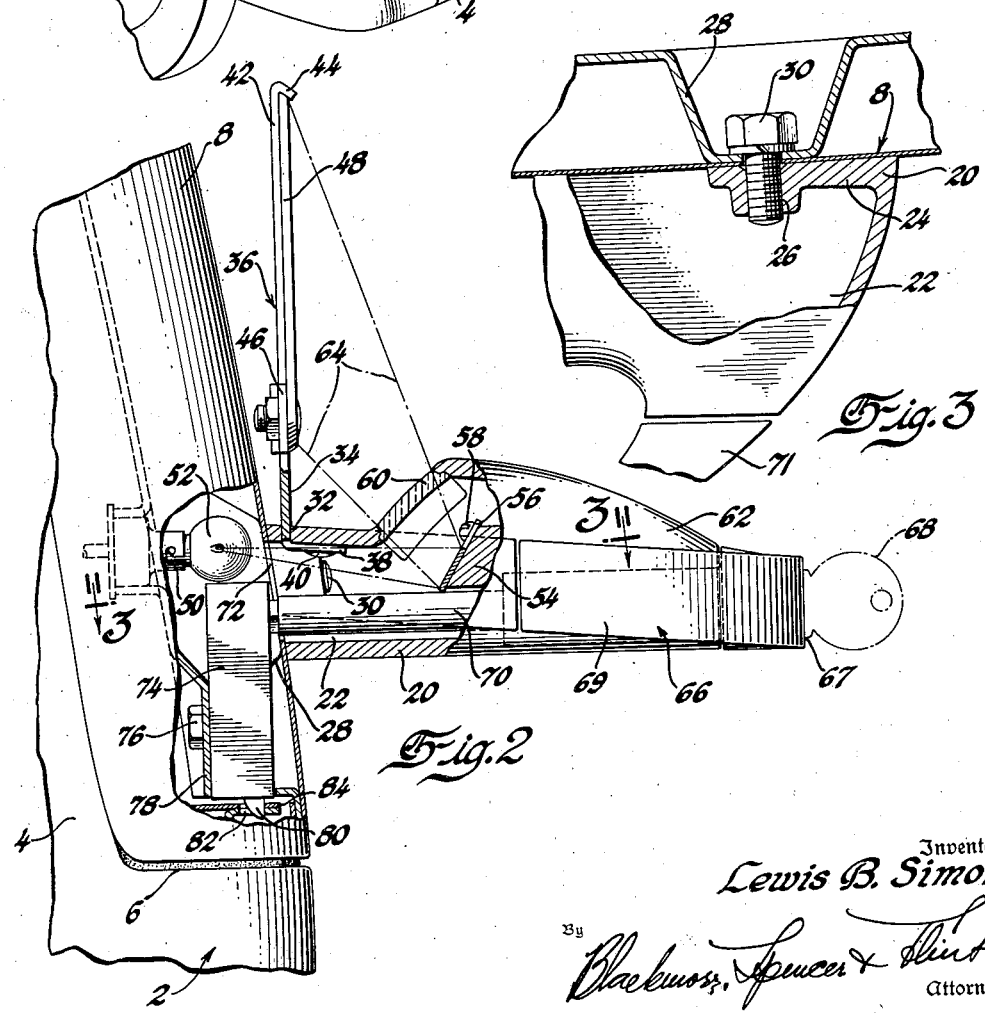
Inventor
Lewis B. Simon
By Blackmore, Spencer & Flint
Attorneys Patented May 13, 1941

2,241,647

UNITED STATES PATENT OFFICE 2,241,647

LICENSE PLATE AND TRUNK HANDLE ASSEMBLY

Lewis B. Simon, Detroit, Mich., assignor to General Motors Corporation, Detroit, Mich., a corporation of Delaware Application September 16, 1939, Serial No. 295,229

3 Claims. (Cl. 40—130)

This invention relates to automotive vehicles and has particular reference to an improvement in a combined rear door handle, rear door latch mounting, license plate holder, and illuminator for the license plate.

In the prior art most of these devices have been assembled individually, although in some instances one or two of them have been combined, and their separate mounting has necessitated separate attaching features for each individual unit. This older construction is more expensive and does not give as neat an appearance as the combined structure of the instant application.

The essential novelty of the invention relates to the mounting on the rear door of the automobile, a hollow bracket or casting on which the license plate holder is secured. The hollow casting has a mirror therein and a window in the top thereof and a light in the door shines through the hollow casting onto the mirror and through the window to illuminate the license plate. At the same time the rear door handle is turnably mounted on the bracket and is shaped so as to appear to be a continuation or a part of the bracket. This handle has the usual key operated lock therein and is secured to a shaft which operates the rear latch of the door.

On the drawing:

Figure 1 is a perspective view of the rear end of an automobile showing the invention applied.

Figure 2 is a detailed view partially in section through the center of the bracket or casting.

Figure 3 is a detailed sectional view showing the manner of securing the bracket or casting to the rear door.

Referring to the drawing, the numeral 2 indicates an automobile as a whole. This automobile has the rear deck 4 provided with an opening 6 closed by a door 8 mounted at its upper end on hinges 10. The rear wheels are indicated at 12, the hub cap at 14, and the usual tire at 16. The fenders are indicated at 18, the rear tail lights at 19. The parts so far described are conventional, and per se form no part of the invention.

The novel bracket or casting of the invention is indicated at 20 and is hollow as indicated at 22 in Figures 2 and 3. Each end of the bracket has the inwardly projecting part 24 provided with a threaded opening 26. This opening mates with an outwardly bent reinforcement 28 formed in the framing of the door 8. A machine bolt 30 passes through an opening in the reinforcement 28 and is threaded into the opening 26 rigidly to hold the bracket or casting 20 on the door.

The upper part of the bracket is provided with an opening 32 through which there extends the foot 34 of a license plate holder 36. The foot 34 is bent inside the bracket as shown at 38 and is secured to the bracket by means of rivets 40, or otherwise. The license plate holder 36 comprises the upright member 42 having the hook end 44, and the transverse member 46 to which the lower side of the license plate 48 is secured.

Inside the door 8 there is mounted a socket 50 in which there is removably received the light bulb 52, this light bulb being connected to the usual wiring or lighting system of the vehicle. The light 52 is positioned at an opening 72 and immediately in the rear of the central hollow part 22 of the bracket 20 and shines through the hollow part and onto a mirror 56 which is mounted by means of the screws 58 on an inclined surface on an inner member 54. The mirror is adapted to reflect the light coming from the bulb upwardly at an angle and to pass through a window 60 mounted in the upper bulged part 62 of the bracket 20. This window is of a suitable width so that the light beams indicated at 64 will be reflected by the mirror through the window and onto the license plate 48.

The handle 66 for the rear door has the usual key operated lock barrel 67 mounted therein. The key is indicated at 68. The handle has the lateral arms 69 and 71 spaced from the bracket and whose inner and outer contours are a continuation of adjacent parts of the bracket 20. The outer contour of the handle and bracket is curved in plan. This handle is secured to the outer end of a shaft 70 mounted in the bracket 20. The handle extends inwardly through the opening 72 in the door and operatively into engagement with the latch mechanism enclosed in the housing 74. This housing is secured by means of bolts 76 to the framing 78 of the door. A latch bolt 80 is operated by the shaft 70 and engages in an opening 82 in a flange 84 formed in the framing around the opening 6.

I claim:

1. In an automotive vehicle having a rear door, a hollow casting secured to the door and comprising a mounting means for a license plate holder and a mounting means for a latch for the door, a handle mounted in the casting and capable of use to raise the door or of being rotated to operate the latch, a window in the casting, an inclined mirror in the casting adjacent the window, a source of light in the door capable of shining through an opening therein onto the mirror, and a license plate holder mounted on the casting and having a license plate therein capable of being illuminated by light from the source reflected from the mirror through the window.

2. In an automotive vehicle having a rear door, a hollow casting secured to the door and comprising a mounting means for a license plate holder and a mounting means for a door handle, a latch for the door mounted in the casting, a handle mounted in said casting and capable of being used to raise the door or of being rotated to operate the latch, a key operated lock barrel mounted in the handle and capable of locking the handle against rotation, a license plate holder mounted on the casting, a window in the casing adjacent the license plate holder, a reflecting mirror in the casting adjacent the window, a source of light in the door, said door having an opening to enable the rays of light to fall on the mirror, the reflected rays from said mirror passing through the window to illuminate a license plate mounted in the holder.

3. In an automotive vehicle having a rear door, a handle capable of use to raise the door, a license plate holder, a hollow casting secured to the door and forming a mounting means for the license plate holder and the handle, a window in the casting adjacent the license plate holder, a reflector in the casting adjacent the window, a source of light in the door, said door having an opening to enable the light to shine into the hollow casting and on the reflector, the reflected light from the reflector shining through the window and onto a license plate in the holder.

LEWIS B. SIMON.